(12) United States Patent
Chubbs, III

(10) Patent No.: US 6,400,304 B1
(45) Date of Patent: Jun. 4, 2002

(54) INTEGRATED GPS RADAR SPEED DETECTION SYSTEM

(76) Inventor: William Chubbs, III, 2335 Justine Ter., Lithia Spring, GA (US) 30122

( * ) Notice: Subject to any disclaimer, the term of this patent is extended or adjusted under 35 U.S.C. 154(b) by 0 days.

(21) Appl. No.: 09/571,016

(22) Filed: May 15, 2000

(51) Int. Cl.[7] ................................................. G01S 7/40
(52) U.S. Cl. .......................... 342/20; 342/52; 342/104; 342/118; 342/175; 342/195; 342/357.06; 342/357.13
(58) Field of Search .............................. 342/20, 52, 58, 342/104, 105, 175, 195, 357.01, 357.02–357.17, 118; 340/936

(56) References Cited

U.S. PATENT DOCUMENTS

| | | | | |
|---|---|---|---|---|
| 5,510,793 A | * | 4/1996 | Gregg, III et al. ............ | 342/20 |
| 5,815,092 A | * | 9/1998 | Gregg, III et al. ........... | 340/936 |
| 6,201,493 B1 | * | 3/2001 | Silverman ..................... | 342/20 |
| 6,204,798 B1 | * | 3/2001 | Fleming, III ................. | 342/20 |

* cited by examiner

Primary Examiner—Bernarr E. Gregory
(74) Attorney, Agent, or Firm—William B. Noll

(57) ABSTRACT

The combination of a global positioning satellite system (GPS) and a radar detection unit, in wireless communication with the GPU, for tracking and determining the speed of a vehicle. The system may be manually activated, or more preferably activated by an external source of radar signals, such as may be emitted by a police "speed trap". The unit includes means for recording and storing speed data of the vehicle, and to alerting the operator of the vehicle to a "speed trap" situation.

5 Claims, 2 Drawing Sheets

INTEGRATED GPS RADAR SPEED DETECTION SYSTEM

FIELD OF THE INVENTION

This invention relates to the field of speed detection systems, more particularly to an integrated system utilizing a global positioning satellite and triggered by external radar signals.

BACKGROUND OF THE INVENTION

The present invention is directed to a speed detection system that relies upon the pinpoint accuracy of a Global Positioning Satellite System (GPS), and a portable unit in communication therewith, where the unit is triggered by ground radar signals. The unit, as later described, has particular utility as a means to confirm and document the speed of one's vehicle should the vehicle be the target of a radar speed trap frequently used by police agencies to catch speeders. Unfortunately, radar speed traps are not always accurate as there may be human error or misidentified vehicles. By way of brief background, a radar speed trap, as known in the art, uses a radar antenna emitting outgoing radio waves and receiving reflecting waves. That is, a radar signal is fired at a moving vehicle to measure its speed. The frequency of the returning signal increases if the vehicle is approaching and decreases if it is departing. The change of frequency depends on the speed, and a radar speed trap measures this change to display the speed of the vehicle.

The frequency of a signal is the rate at which the waves of energy pass a point. If the vehicle is approaching the speed trap, it travels into the radio waves and reflects them more often to increase the frequency. If the vehicle is moving away, it takes longer for each wave to meet the vehicle and the frequency of the reflected signal decreases.

Some vehicles are now equipped with radar detection devices that alert the driver to his/her entry into a potential radar speed trap. However, it may be too late to slow down and avoid a ticket, and the effect it may have on one's driving privileges. The present invention at least provides a system, utilizing the GPS, to legally challenge the accuracy of the official police report. The validity of one's challenge relies upon the GPS.

Global positioning devices, as known in the art, are devices used to steer cars, fly planes or find missing skiers and hikers to give pinpoint accuracy to a person's global location. Heretofore, these devices have been a major aid to military operations, but now the pinpoint accuracy of the systems has been made available for civilian use. Such devices rely upon a network of satellites, where the network is known as the Global Positioning System (GPS).

This invention uniquely combines the features of the newly expanded GPS system as an accurate means to confirm and/or challenge an official claim of excessive vehicular speed. The manner by which this system provides assurance to the driver will become apparent in the description which follows, particularly by those skilled in the art.

SUMMARY OF THE INVENTION

The present invention relates to an integrated GPS radar speed detection system. The system includes a portable radar GPS receiver, in wireless communication with a global positioning satellite, for mounting at a convenient location in a vehicle. The receiver includes a GPS or digital speedometer wiring/circuit board, a speed data storage circuit board, a speed capture circuit board, a speed and time/date stamp, and means for determining the signal strength. Since the receiver is activated by external radar signals, such as from an official moving police vehicle or stationary speed trap, the receiver further includes a radar detector circuit board. While the receiver is powered by the vehicle's battery system, an optional battery backup wiring/circuit board may be provided. Finally, visual and audio means are included to ensure notification of the operating status of the system.

Accordingly, an object of the invention is to provide a portable system for the operator of a vehicle, through the use of a global positioning satellite system, to digitally record one's speed as a way to effectively challenge an official summons for speeding, for example.

Another object hereof is the provision of a portable unit that alerts drivers of their exact speed by displaying accurately actual vehicle speed.

A further object of the invention is to provide a backup to one's speedometer, and to identify faulty or inaccurate factory installed speedometers.

Still another object hereof is the provision of visual means giving a date and time stamp so that official police radar patterns can be monitored and logged in an area of driver's concerns.

These and other objects will become more apparent from the following specification, and accompanying drawings

BRIEF DESCRIPTION OF DRAWINGS

FIG. 3 is an external view of the radar receiver unit of FIG. 2, showing the types of controls displays or information generated by the unit.

DETAILED DESCRIPTION OF PREFERRED EMBODIMENT

Figure 1:
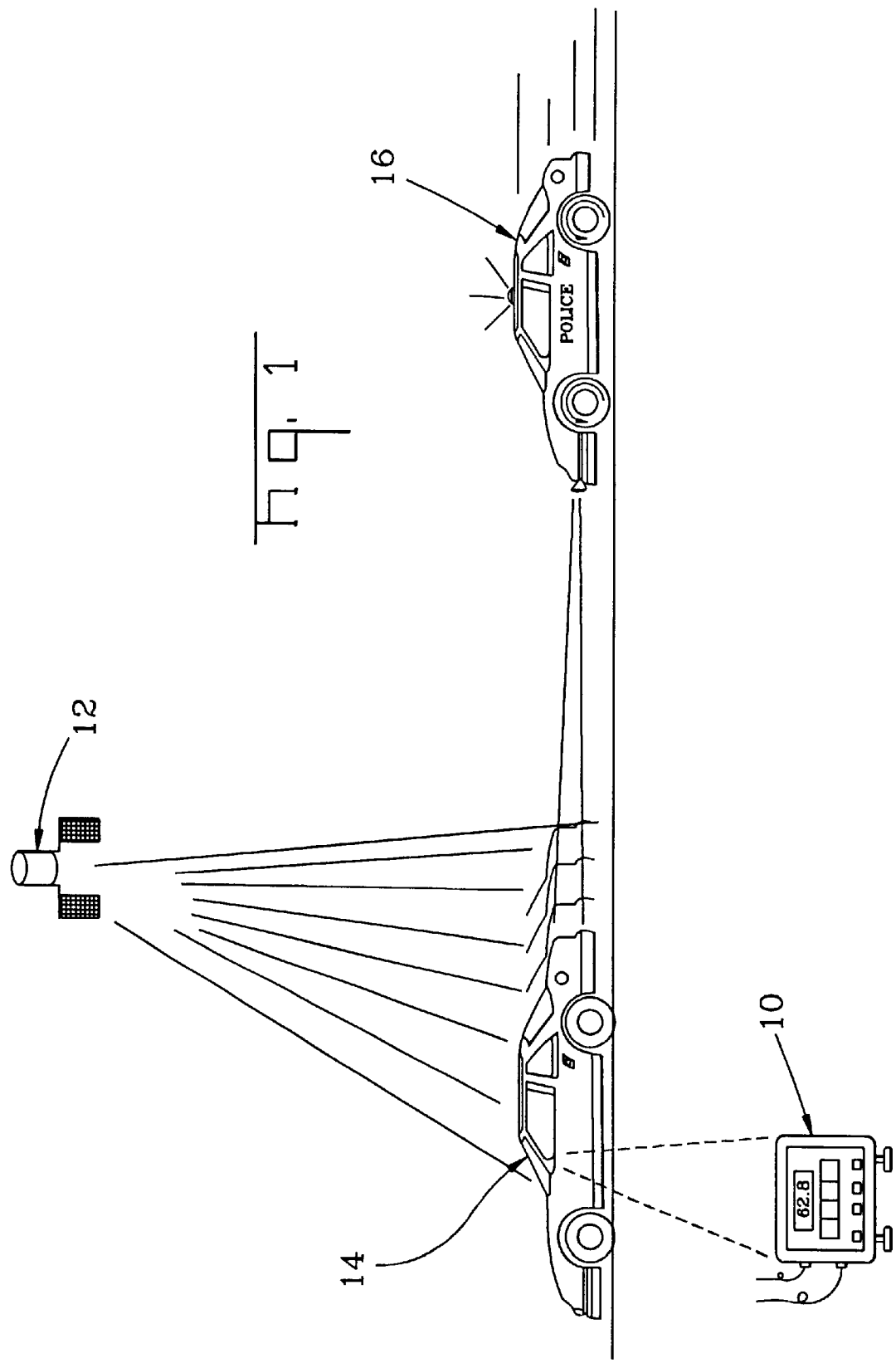
FIG. 1 is a simplified view illustrating the integrated GPS radar speed detection system of this invention, showing a GPS satellite in wireless communication with a vehicle, where the vehicle mounts a radar receiving unit (shown exploded from the vehicle), and a following police vehicle emitting a radar signal to ascertain the speed of the leading vehicle.

This invention is directed to a uniquely designed speed detection system that incorporates the high speed and pinpoint accuracy of a global positioning satellite system, to allow a user of the system hereof to determine and record the speed of the user's vehicle. This is particularly helpful in situations where it may be necessary to legally challenge in a court proceeding a charge of excessive speed by a police official. The system of this invention will now be described with regard to the several accompanying Figures, where like reference numerals represent like components or features throughout the various views.

FIG. 1 is a simplified illustration showing the preferred use of the system of the invention, where the system comprises a portable unit 10 in wireless communication with a GPS satellite 12, as known in the art. The unit 10 is conveniently mounted within a vehicle 14, where said vehicle may be the target of a radar emitting police vehicle 16 intent on "nabbing" the operator for excessive speed.

Figure 2:
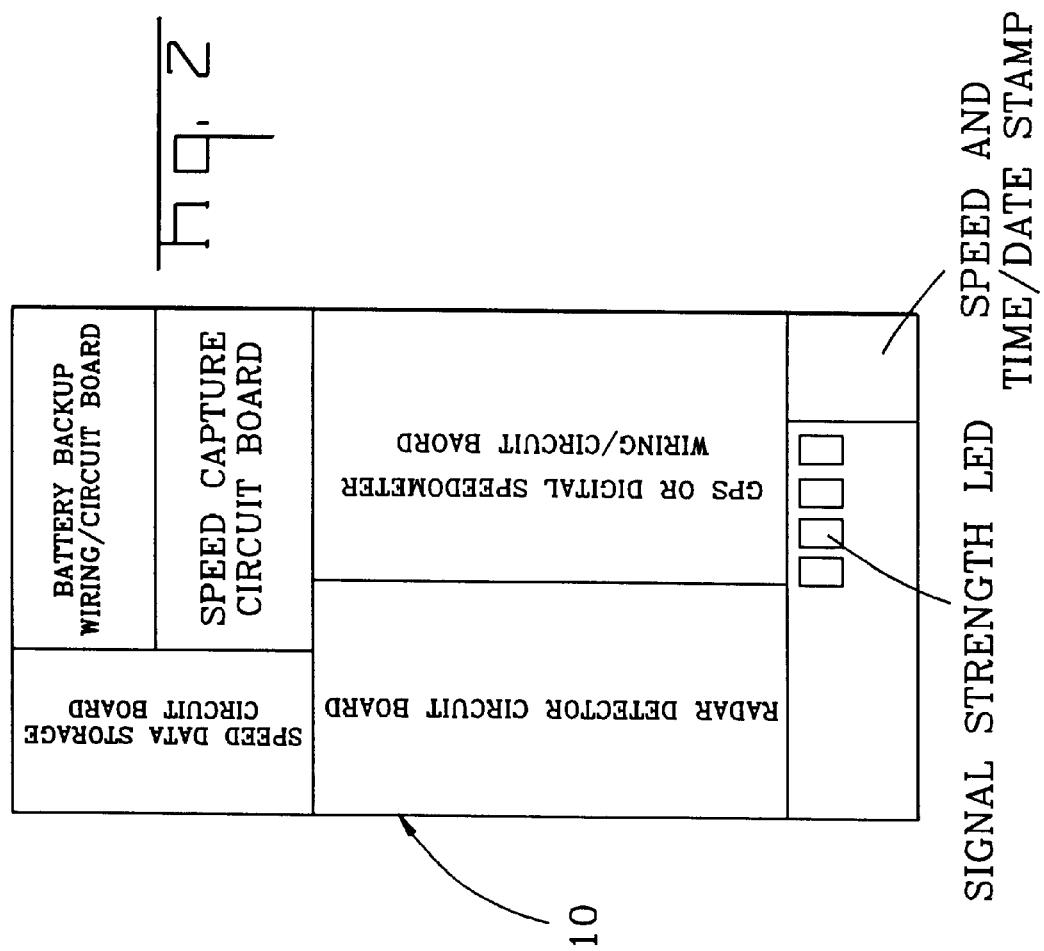
FIG. 2 is a simplified internal view identifying the various components comprising the radar receiver unit of this invention.
Figure 1:
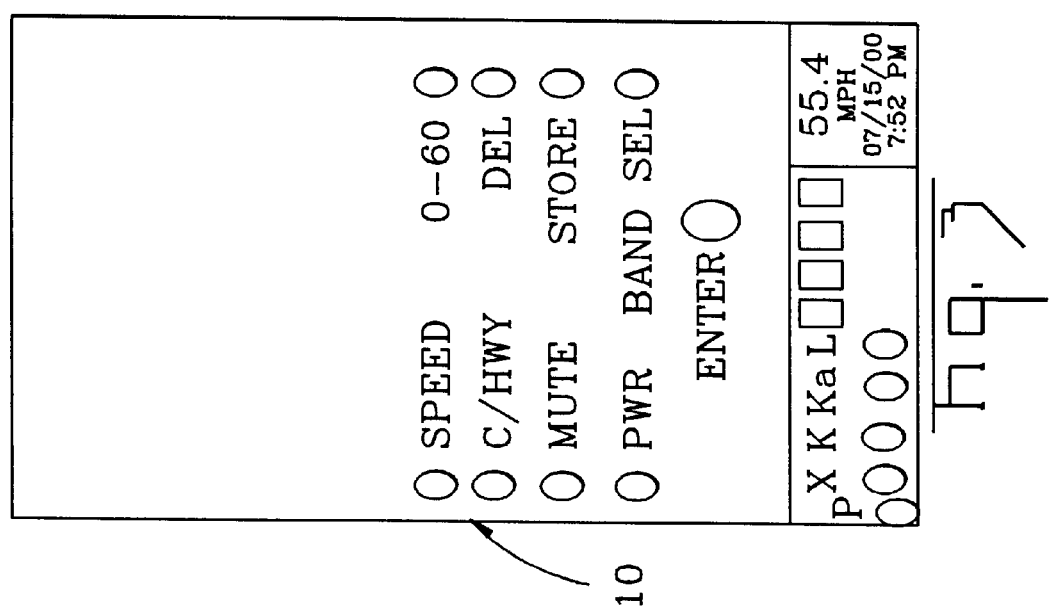

FIGS. 2 and 3 illustrate details of the unit 10. The unit 10, which is a portable radar GPS receiver, as best seen in FIG. 2, includes a GPS or digital speedometer wiring/circuit board, a speed data storage circuit board, a speed capture circuit board, a speed data time/date stamp, and a signal strength determining means, where the signal intensity of the latter will indicate how close one is to the police radar source. Further, since the primary activation is by detection of a targeting radar source, the unit 10 also includes a radar detector circuit board. Further, an alternate power source may be included, such as a pair of AA batteries. This is particularly important should it be necessary in a court proceeding to verify or support one's contention that the "speed trap" was incorrect. Finally, audio and/or visual means are provided to alert the vehicle operator to an oncoming radar signal, and to means to activate various components of the unit 10.

In operation, when the unit detects a radar or lasar (R/L) signal from a police speed trap officer, the unit 10 will sound an audible alarm and the signal strength LED will light up based on the proximity of the R/L signal to the operator's vehicle. The unit 10 will display, such as by blinking, the highest speed and the dateline that the highest speed occurred once the unit 10 has detected an R/L signal. This information will remain on display for about one (1) minute, or for a preprogrammed time period, or until the unit registers a higher speed during an R/L occurrence. The one (1) minute speed display time will give the operator the opportunity to store the information (speed and DTS) if desired by depressing the store (STORE) button and then (ENTER) on the unit 10, or delete the information by depressing the delete (DEL) button, and then (ENTER) on the unit 10. The speed and DTS will go off display once information has been stored/deleted, or the one (1) minute store interval has expired. The unit 10 may include a (AA) battery as a back-up so that stored information can be retrieved from the unit 10 without a power cord being necessary. This can be useful should the stored information in the unit 10 be needed as evidence in a court proceeding. The unit 10 can be setup to display the speed of the vehicle at all times, or the speed display can be setup to display the speed only when an R/L signal is detected. To select speed display the operator will depress the (SPEED) button to toggle the speed display either On or Off. When the display is toggled to the (Off) position, the speed display will only become visible when an R/L signal is detected by the unit 10. The unit 10 will be tamper proof The unit 10 will cease to operate if the internal mechanisms in the unit 10 are tampered with or altered. The operator can select which bands of R/L signals he/she wishes the speeds to capture. This is done by depressing the (BAND SEL) button on the unit 10 until the bands to be selected are displayed. The operator will depress (ENTER) for each band of R/L signals to select. This will allow the unit 10 to capture and store speeds for the desired bands of R/L signals only. The unit 10 may also have an added feature for displaying the (0–60 mph) time for a vehicle. To place the unit 10 in the 0–60 mph mode, one must depress the (0–60) button on the unit and then press the (ENTER) button. The unit 10 will make a "standing start" 0–60 mph determination and display the time in the usual speed display area. The time will be measured in seconds (SEC).

It is recognized that changes, varistions and modifications may be made to the system of this invention, such as the inclusion of different functions, without departing from the spirit and scope of the invention. Accordingly, no limitation is intended to be imposed hereon except as set forth in the appended claims.

What is claimed is:

1. In combination with a global positioning satellite system suitable for monitoring the speed of a moving vehicle, a portable radar detection unit in wireless communication with said system, said radar detection unit comprising a digital speedometer wiring/circuit board that monitors said speed of said vehicle, a speed data storage circuit board, a speed capture circuit board to record a maximum said speed during operation of said unit, means for visually recording the rate for said maximum speed, means for detecting an exterior, remote radar signal source, where said detection is a means to activate said unit, and further including means for identifying the distance between said moving vehicle and said radar signal source.

2. The combination according to claim 1, including audio/visual means to alert the user to the activation of said unit.

3. The combination according to claim 1, wherein said maximum speed is recorded and maintained for a preprogrammed period of time, until a greater speed is recorded.

4. The combination according to claim 1, wherein said unit is programmed to identify only a preselected band of said radar signals.

5. The combination according to claim 1, wherein said unit is manually set to display a constant readout of vehicular speed.

* * * * *